(12) United States Patent
Gomaa et al.

(10) Patent No.: US 10,752,828 B2
(45) Date of Patent: Aug. 25, 2020

(54) PROCESSES FOR FRACTURING USING SHAPE MEMORY ALLOYS

(71) Applicant: Saudi Arabian Oil Company, Dhahran (SA)

(72) Inventors: Ahmed M. Gomaa, Khobar (SA); Khalid M. Alruwaili, Dhahran (SA); Ghaithan A. Muntasheri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/040,955

(22) Filed: Jul. 20, 2018

(65) Prior Publication Data

US 2020/0024507 A1  Jan. 23, 2020

(51) Int. Cl.
  *C09K 8/80* (2006.01)
  *C09K 8/66* (2006.01)
  *E21B 43/26* (2006.01)
  *E21B 43/267* (2006.01)
  *C09K 8/70* (2006.01)

(52) U.S. Cl.
  CPC .............. *C09K 8/80* (2013.01); *C09K 8/66* (2013.01); *C09K 8/703* (2013.01); *E21B 43/26* (2013.01); *E21B 43/267* (2013.01)

(58) Field of Classification Search
  None
  See application file for complete search history.

(56) References Cited

U.S. PATENT DOCUMENTS

| | | | |
|---|---|---|---|
| 6,752,208 B1* | 6/2004 | Nguyen | E21B 43/025 166/278 |
| 7,086,460 B2* | 8/2006 | Nguyen | E21B 43/025 166/51 |
| 2012/0181023 A1 | 7/2012 | Guerrero et al. | |
| 2016/0122631 A1 | 5/2016 | Rodriguez | |
| 2016/0222772 A1 | 8/2016 | Al-Muntasheri et al. | |
| 2018/0037803 A1 | 2/2018 | Dahi Taleghani et al. | |

(Continued)

FOREIGN PATENT DOCUMENTS

WO   2018118014 A1   6/2018

OTHER PUBLICATIONS

Inaba et al., "Static rock breaker using shape memory alloy", International Society for Rock Mechanics, 7th ISRM Congress, Aachen, Germany, Sep. 16-20, 1991.

(Continued)

*Primary Examiner* — Matthew R Buck
*Assistant Examiner* — Douglas S Wood
(74) *Attorney, Agent, or Firm* — Dinsmore & Shohl LLP

(57) ABSTRACT

A method for extracting natural gas or petroleum-based products, including: introducing shape memory alloy beads into a wellbore with hydraulic fracturing fluid to form a bridge comprising shape memory alloy beads in a tertiary path, where the shape memory alloy beads forming the bridge have a first phase, and the hydraulic fracturing fluid has an initial hydraulic fracturing fluid flow rate across the bridge; applying a pressure to transform the shape memory alloy beads to a second phase, where deforming the shape memory alloy beads causes the hydraulic fracturing fluid to have a second hydraulic fracturing fluid flow rate across the bridge.

21 Claims, 6 Drawing Sheets

(56) References Cited

U.S. PATENT DOCUMENTS

2018/0265770 A1  9/2018 Crews et al.

OTHER PUBLICATIONS

Lewis et al., "Shape Memory Alloy: Low-Cost Manufacturing for the Oil and Gas Industry", Offshore Technology Conference, Houston, Texas, May 6-9, 2013, Paper SPE-24257-MS.
Osunjaye et al., "Open Hole Sand Control Optimization Using Shape Memory Polymer Conformable Screen With Inflow Control Application", SPE Middle East Oil & Gas Show and Conference, Mar. 6-9, 2017, Paper SPE-183947-MS.
Song et al., "An Innovative Ultradeepwater Subsea Blowout Preventer (SSBOP) Control System Using Shape Memory Alloy Actuators", IADC/SPE Drilling Conference, Miami, Florida, Feb. 21-23, 2006.
International Search Report and Written Opinion dated Oct. 14, 2019 pertaining to International application No. PCT/US2019/041788 filed Jul. 15, 2019, 13 pgs.

* cited by examiner

PROCESSES FOR FRACTURING USING SHAPE MEMORY ALLOYS

TECHNICAL FIELD

Embodiments of the present description generally relate to hydraulic fracturing and, more specifically, to hydraulic fracturing using shape memory alloys.

BACKGROUND

Hydraulic fracturing is a process where a hydraulic fracturing fluid is introduced at pressure into a wellbore that has been drilled in a geological formation. The hydraulic fracturing fluid migrates into some tertiary paths (such as paths that are smaller than the wellbore including, but not limited to, cracks, fissures, gaps, slits, and other fractures) in the geological formation—some tertiary paths may have been formed by the presence of the pressurized hydraulic fluid in the wellbore. The hydraulic fracturing fluid increases the size of the tertiary paths in the geological formation. The hydraulic fracturing fluid is then removed from the wellbore, and the increase in tertiary path size caused by the hydraulic fracturing fluid increases the permeability of the geological formation. This allows for improved flow of natural gas, petroleum, and brine from the geological formation.

In some cases, the tertiary path size in the geological formation will decrease when the hydraulic fracturing fluid is removed from the wellbore. To ameliorate this effect, proppants (such as sand, ceramic, and the like) are added to the hydraulic fracturing fluid to maintain the increased size of the tertiary paths in the geological formation after the hydraulic fluid is removed from the wellbore. This is achieved because proppants deposited into the tertiary paths while the hydraulic fracturing fluid is present and remains in the tertiary paths after the hydraulic fracturing fluid is removed from the wellbore.

SUMMARY

It has been found that as the hydraulic fracturing fluid is introduced into a wellbore at greater pressure, the hydraulic fracturing fluid may not enter many tertiary paths in the geological formation. Thus, the geological formation is not as permeable as it could be if the hydraulic fracturing fluid were more efficient in its fracturing activity. The hydraulic fracturing solution may not enter one or more tertiary paths because the tertiary paths have smaller diameter than other paths in the geological formation. Thus, the hydraulic fracturing solution will enter the paths with greater diameter at the exclusion of tertiary paths with smaller diameters. Accordingly, there is a need for processes of hydraulic fracturing that increase the number of tertiary paths in which the hydraulic fluid is present. As provided in this disclosure, processes that use one or more shape memory alloy in the hydraulic fluid allow the hydraulic fluid to fill a greater number of tertiary paths in the geological formation and, thereby, provide greater permeability.

In particular, the present disclosure is directed to using one or more shape memory alloy (SMA) in complex fracturing processes. Particularly, the process includes introducing SMA beads into a wellbore where the beads will collect and form a "bridge" in tertiary paths. A pressure drop caused by the bridge of SMA beads in the tertiary path and the increasing temperature of the hydraulic fracturing fluid as it traverses the wellbore will cause the SMA beads to deform. This deformation forms a blockage that decreases the flow rate of the hydraulic fracturing fluid in the portions of the tertiary path where the SMA bridge is present, and that re-directs the fracturing fluid into downstream portions of tertiary paths or downstream tertiary paths and increases the amount of fracturing. The SMA beads can then be returned to their original shape by the natural heating within the wellbore, which increases the flow rate of the hydraulic fracturing fluid in the near field or far-field formation.

In one embodiment, a method for extracting natural gas or petroleum-based products, includes: introducing shape memory alloy beads into a wellbore with hydraulic fracturing fluid to form a bridge comprising shape memory alloy beads in a tertiary path, where the shape memory alloy beads forming the bridge have a first phase, and the hydraulic fracturing fluid has an initial hydraulic fracturing fluid flow rate across the bridge; applying a pressure to transform the shape memory alloy beads forming the bridge to a second phase, where deforming the shape memory alloy beads forming the bridge causes the hydraulic fracturing fluid to have a second hydraulic fracturing fluid flow rate across the bridge, where the second hydraulic fracturing fluid flow rate is less than the initial hydraulic fracturing fluid flow rate; and introducing hydraulic fracturing fluid such that the temperature of the shape memory alloy beads forming the bridge approach the temperature of the hydrocarbon-bearing formation and convert from the second phase to the first phase.

Additional features and advantages will be set forth in the detailed description which follows, and in part will be readily apparent to those skilled in the art from that description or recognized by practicing the embodiments described in this application, including the subsequent detailed description, the claims, as well as the appended drawings.

It is to be understood that both the preceding general description and the subsequent detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described in this application, and together with the description serve to explain the principles and operations of the claimed subject matter.

DETAILED DESCRIPTION

Figure 1:
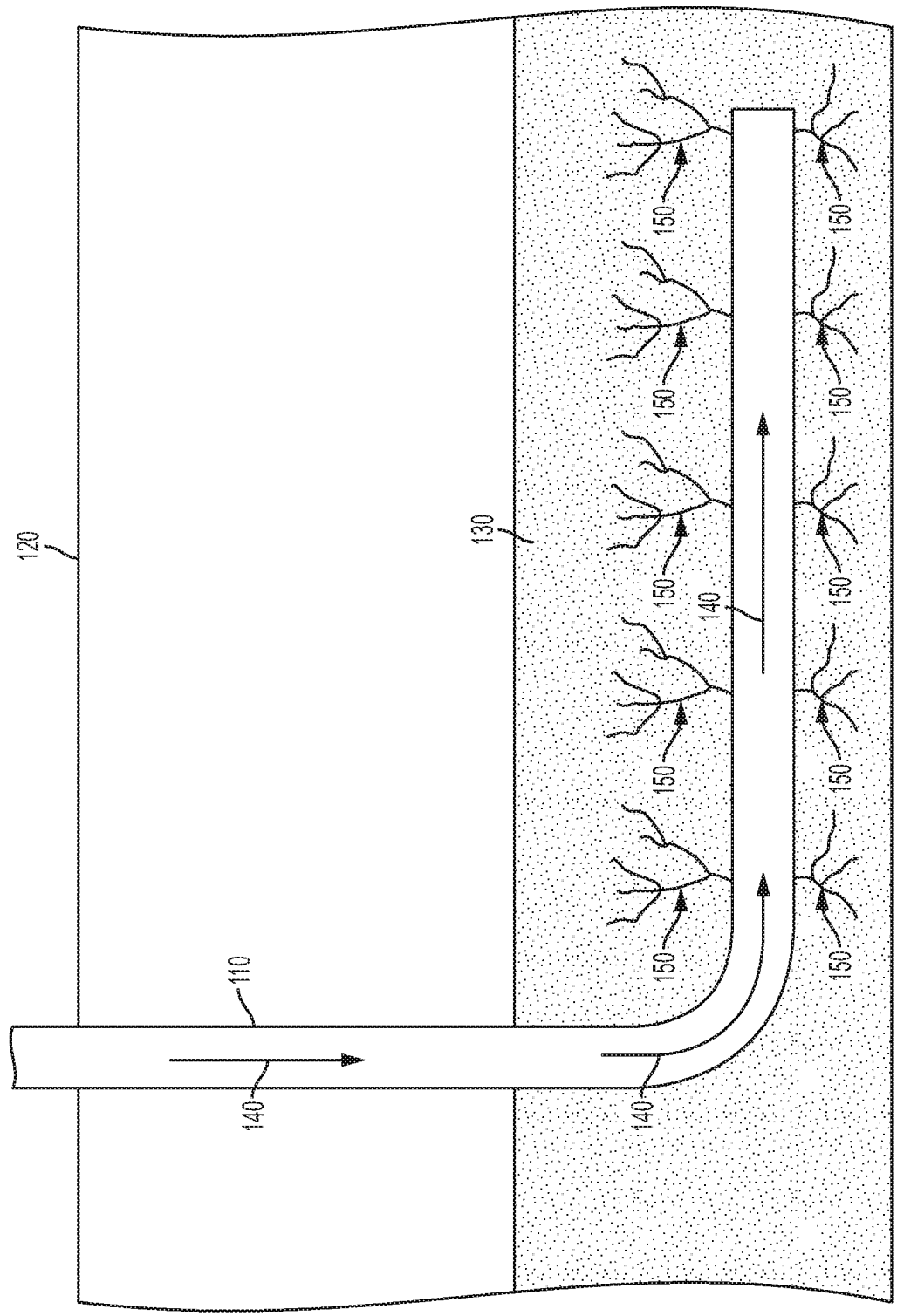
FIG. 1 is a schematic of a wellbore for hydraulic fracturing.

In the present description, the following terms or units of measurement have been abbreviated, where:

SMA=Shape Memory Alloy;
gm/cc=gram per cubic centimeter;
bbl/min=barrels per minute;
OBM=oil-based mud;
VES=visco-elastic surfactant;

Cu—Al—Ni=copper-aluminum-nickel shape memory alloy;
Ni—Ti=nickel-titanium shape memory alloy;
Fe—Mn—Si=iron-manganese-silicon shape memory alloy;
Cu—Zn—Al=copper-zinc-aluminum shape memory alloy;
mm=millimeter;
in=inch;
ppga=pounds per gallon; and
PLA=polylactic acid.

Embodiments of the present description are directed to SMAs added to a hydraulic fracturing solution. Hydraulic fracturing solutions are known, and SMAs may be added to any commercially available hydraulic fracturing solution. As used in this description, "near wellbore" is defined as the perforation zone and the inlet of fracturing, and "far-field" is defined as being inside the fracture where the width of a fracture is less than 0.01 inches.

A wellbore is a hole that extends from the surface to a location below the surface. The wellbore can permit access as a pathway between the surface and a hydrocarbon-bearing formation. The wellbore, defined and bound along its operative length by a wellbore wall, extends from a proximate end at the surface, through the subsurface, and into the hydrocarbon-bearing formation, where it terminates at a distal wellbore face. The wellbore forms a pathway capable of permitting both fluid and apparatus to traverse between the surface and the hydrocarbon-bearing formation.

Besides defining the void volume of the wellbore, the wellbore wall also acts as the interface through which fluid can transition between the interior of the wellbore and the formations through which the wellbore traverses. The wellbore wall can be unlined (that is, bare rock or formation) to permit such interaction with the formation or lined (that is, with casing, tubing, production liner or cement) so as to not permit such interactions.

The wellbore usually contains at least a portion of at least one tubular (that is, a fluid conduit) that links the interior of the wellbore to the surface. Examples of such fluid conduits or tubulars include casing, liners, pipes, tubes, coiled tubing and mechanical structures with interior voids. A fluid conduit connected to the surface is capable of permitting regulated fluid flow and access between equipment on the surface and the interior of the wellbore. Example equipment connected at the surface to the fluid conduit includes pipelines, tanks, pumps, compressors and flares. The fluid conduit is sometimes large enough to permit introduction and removal of mechanical devices, including tools, drill strings, sensors and instruments, into and out of the interior of the wellbore.

The fluid conduit made from a tubular usually has at least two openings (typically on opposing ends) with an enclosing surface having an interior and exterior surface. The interior surface acts to define the bounds of the fluid conduit. Examples of tubulars and portions of tubulars used in the wellbore as fluid conduits or for making or extending fluid conduits include casing, production liners, coiled tubing, pipe segments and pipe strings. An assembly of several smaller tubulars connected to one another, such as joined pipe segments or casing, can form a tubular that acts as a fluid conduit.

When positioning a tubular or a portion of tubular in the wellbore, the volume between the exterior surfaces of the fluid conduit or tubular portion and the wellbore wall of the wellbore forms and defines a wellbore annulus. The wellbore annulus has a volume in between the external surface of the tubular or fluid conduit and the wellbore wall.

The wellbore contains wellbore fluid from the first moment of formation until completion and production. The wellbore fluid serves several purposes, including well control (hydraulic pressure against the fluids in the hydrocarbon-bearing formation), wellbore wall integrity (hydraulic pressure on the wellbore wall; provides loss control additives) and lubricity (operating machinery). Wellbore fluid is in fluid contact with all portions of the wellbore and everything in the wellbore that is not fluidly isolated, including the tubular internal fluid conduit, the wellbore annulus, and the wellbore wall. Other fluid conduits coupled to the wellbore often contain at least some wellbore fluid.

While drilling, drilling fluid ("mud") fills the interior of the wellbore as the wellbore fluid. Some muds are petroleum-based materials and some are water-based materials. Petroleum-based materials include at least 90 weight percent of an oil-based mud (OBM). Examples of suitable base petroleum materials include crude oils, distilled fractions of crude oil, including diesel oil, kerosene and mineral oil, and heavy petroleum refinery liquid residues. A minor part of the OBM is typically water or an aqueous solution that resides internally in the continuous petroleum phase. Other OBM components can include emulsifiers, wetting agents and other additives that give desirable physical properties.

While performing drilling operations, wellbore fluid circulates between the geological surface and the wellbore interior through fluid conduits. Wellbore fluid also circulates around the interior of the wellbore. The introduction of drilling fluid into the wellbore through a first fluid conduit at pressure induces the motivation for the fluid flow in the wellbore fluid. Displacing wellbore fluid through a second fluid conduit connected to the surface causes wellbore fluid circulation from the first fluid conduit to the second fluid conduit in the interior of the wellbore. The expected amount of wellbore fluid displaced and returned to the surface through the second fluid conduit is equivalent to the amount introduced into the wellbore through the first fluid conduit. Parts of the wellbore that are fluidly isolated do not support circulation.

In embodiments, the hydraulic fracturing fluid is introduced into the wellbore after the drilling is complete and does not mix with the drilling fluid. This separation may be achieved by providing a completion fluid into the wellbore subsequent to the drilling fluid, but before introducing the hydraulic fracturing fluid. The completion fluid may be any commercially available fluid that has properties that will allow the completion fluid to maintain its integrity in the wellbore and will not allow the drilling fluid to mix with the hydraulic fracturing fluid. In embodiments, the completion fluid may be salt water, such as a mixture of water and one or more of KCl, $NH_4Cl$, $CaCl_2$, CaBr, and ZnBr. It should be understood that other completion fluids may be used.

Hydraulic fracturing fluids are known in the art, and the type of hydraulic fracturing fluids used in embodiments of this disclosure is not limited. Rather, the type of hydraulic fracturing fluid used in embodiments will be determined by the type of wellbore and type of geological formation from which the natural gas or petroleum-based product is to be extracted. In some embodiments, the hydraulic fracturing fluid may be selected from the group consisting of slick water, linear gel, crosslinked gel, foamed fluid, visco-elastic surfactant (VES) based fluid, emulsified fluid, and mixtures of these fluids.

As referred to previously, and with reference now to FIG. 1, a wellbore 110 extends from the surface of the ground 120 into a target geological formation 130 (referred to as the "geological formation"). The wellbore 110 may be considered as the primary path in which hydraulic fracturing fluid travels (as indicated by arrows 140 in FIG. 1). The hydraulic fracturing fluid 140 is introduced into the wellbore 110 at pressure and flow rate. The pressure and flow rate will vary depending on the type of target geological formation 130 from which the water (for geothermal wells), natural gas, or petroleum is to be extracted. As the hydraulic fracturing fluid 140 proceeds down the wellbore 110, some of the hydraulic fracturing fluid 140 moves from the wellbore 110 into some tertiary paths 150 (such as fissures and cracks) present in the target geological formation 130. However, the hydraulic fracturing fluid 140 does not enter every tertiary path 150 or the hydraulic fracturing fluid 140 does not reach the extremities of each tertiary path 150. Embodiments described in this disclosure address these issues by adding one or more SMA to the hydraulic fracturing fluid 140. Particularly, the process includes introducing SMA beads into a wellbore where the beads will collect and form a "bridge" in various portions of the tertiary paths 150. A pressure drop caused by the bridge of SMA beads in the tertiary paths 150 will cause the SMA beads to deform, thereby forming a blockage in the wellbore that decreases the flow rate of the hydraulic fracturing fluid 140 in the tertiary path 150 where the SMA bridge is present, and re-directs the fracturing fluid into tertiary paths 150 where no SMA bridge is present, which increases the amount of fracturing. The SMA beads can then be returned to their original shape by heating.

SMAs are alloys that remember their initial shape and when deformed can be returned to their initial shape upon heating. SMAs are generally lightweight, solid-state, and have a density from greater than or equal to 6.0 to less than or equal to 8.0 gm/cc measured by American Society for Testing Materials (ASTM) D792-13 (2013), such as from greater than or equal to 6.2 to less than or equal to 8.0 gm/cc, from greater than or equal to 6.4 to less than or equal to 8.0 gm/cc, from greater than or equal to 6.6 to less than or equal to 8.0 gm/cc, from greater than or equal to 6.8 to less than or equal to 8.0 gm/cc, from greater than or equal to 7.0 to less than or equal to 8.0 gm/cc, from greater than or equal to 7.2 to less than or equal to 8.0 gm/cc, from greater than or equal to 7.4 to less than or equal to 8.0 gm/cc, from greater than or equal to 7.6 to less than or equal to 8.0 gm/cc, or from greater than or equal to 7.8 to less than or equal to 8.0 gm/cc. In some embodiments, the SMAs have a density from greater than or equal to 6.0 gm/cc to less than or equal to 7.8 gm/cc, such as from greater than or equal to 6.0 gm/cc to less than or equal to 7.6 gm/cc, from greater than or equal to 6.0 gm/cc to less than or equal to 7.4 gm/cc, from greater than or equal to 6.0 gm/cc to less than or equal to 7.2 gm/cc, from greater than or equal to 6.0 gm/cc to less than or equal to 7.0 gm/cc, from greater than or equal to 6.0 gm/cc to less than or equal to 6.8 gm/cc, from greater than or equal to 6.0 gm/cc to less than or equal to 6.6 gm/cc, from greater than or equal to 6.0 gm/cc to less than or equal to 6.4 gm/cc, or from greater than or equal to 6.0 gm/cc to less than or equal to 6.2 gm/cc. In some embodiments, the SMAs have a density from greater than or equal to 6.2 gm/cc to less than or equal to 7.8 gm/cc, such as from greater than or equal to 6.4 gm/cc to less than or equal to 7.6 gm/cc, from greater than or equal to 6.6 gm/cc to less than or equal to 7.4 gm/cc, or from greater than or equal to 6.8 gm/cc to less than or equal to 7.2 gm/cc.

Figure 2:
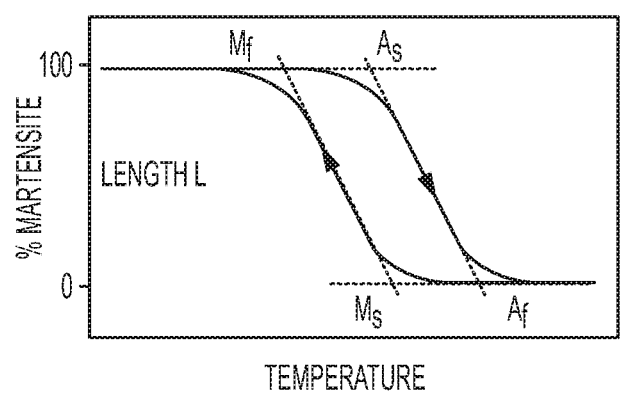
FIG. 2 is a graph showing the phase changes of shape memory alloys from martensite to austenite and from austenite to martensite as a function of temperature.

With reference to FIG. 2, the SMAs return to their pre-deformation shape through a crystalline phase change commonly referred to as thermoelastic martensitic transformation. At temperatures less than the austenite transformation start temperature $A_s$, SMAs are martensitic. In this condition, their microstructure is characterized by self-accommodating twins. The martensite is soft and can be deformed quite easily by de-twinning. Heating greater than the austenite transformation start temperature $A_s$, causes the SMAs to transform into a greater strength austenite phase. This transformation to austenite is complete when the temperature reaches the austenite transformation finish temperature $A_f$. However, the SMAs can be converted back to a martensitic phase by cooling the SMAs to the martensite transformation start temperature $M_s$, and the transformation back to the martensitic phase is complete when the temperature reaches the martensite transformation finish temperature $M_f$. As shown in FIG. 2, the transformation of the SMAs to austenite and the transformation of the SMAs to austenite occur at different temperatures. Repeated use of the shape-memory effect may lead to a shift of the characteristic transformation temperatures. The maximum temperature at which SMAs can no longer be stress induced is called $M_d$ (not shown in FIG. 2), where the SMAs are permanently deformed.

The preceding properties of the SMAs can be manipulated to provide desired results within the tertiary paths. As previously stated, the SMAs have two stable phases: the greater temperature austenite phase and the lesser temperature martensite phase. In addition, the martensite can be present in one of two forms: twinned and detwinned. A phase transformation which occurs between these two phases upon heating or cooling is the basis for the unique properties of the SMAs. Upon cooling in the absence of an applied load, the SMAs transform from austenite into twinned (self-accommodated) martensite. However, even at temperatures greater than the austenite transformation finish temperature $A_f$, if a stress is placed on the SMAs, such as, for example an increased pressure, the SMAs will transform from the austenitic phase to the martensitic phase. The SMAs can then be converted back to the austenitic phase by releasing the stress or by further heating the SMAs. This shape memory effect of the SMAs can be useful in controlling the distribution of hydraulic fracturing fluid to tertiary paths.

Figure 3A:
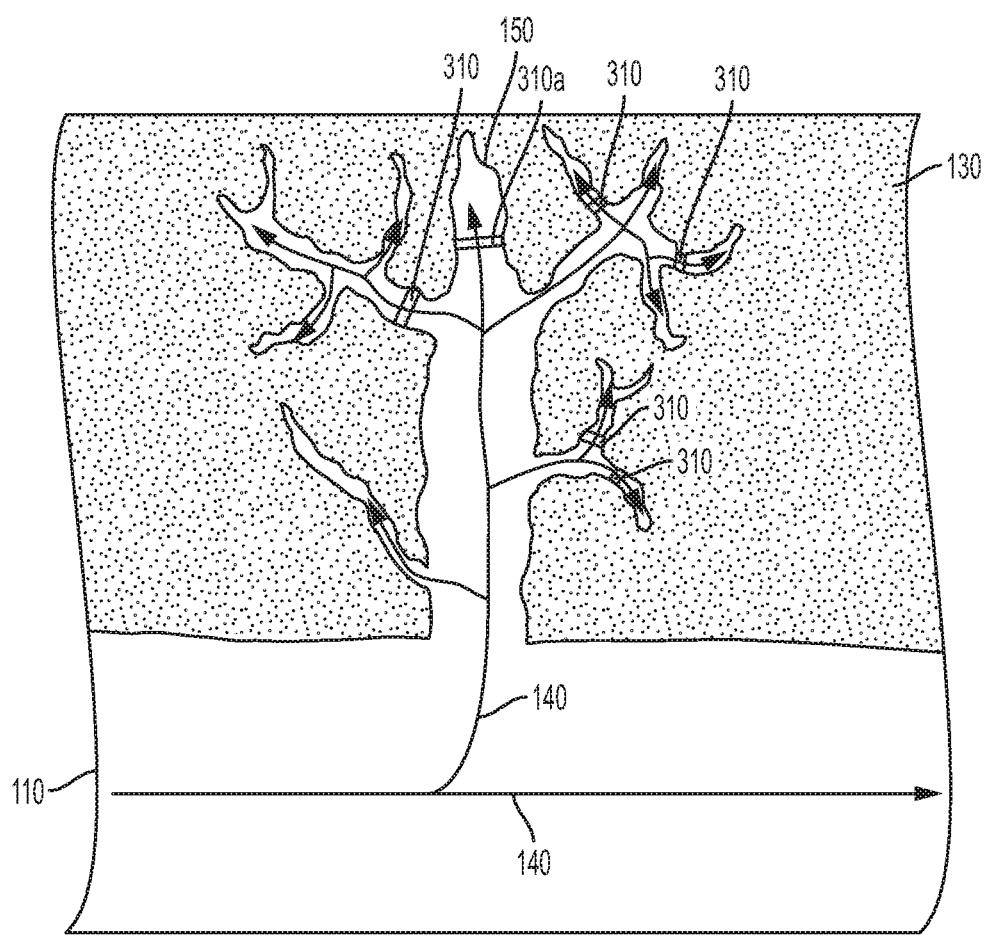
FIGS. 3A and 3C are schematics of a wellbore having a shape memory alloy bridge having a greater hydraulic fluid flow rate according to embodiments of this disclosure.

With reference now to FIG. 3A, the SMAs may, in embodiments, be introduced into the wellbore 110 with the hydraulic fracturing fluid 140 in the form of a small particulate of any shape, which is also referred to in this disclosure as SMA beads. In some embodiments, the SMA beads may be mixed with the hydraulic fracturing fluid 140 prior to the hydraulic fracturing fluid 140 being introduced into the wellbore 110. However, in other embodiments, the SMA beads may be pumped into the wellbore 110 as a separate stream from the hydraulic fracturing fluid 140. In either of these embodiments, the SMA beads will be present and in mixture with the hydraulic fracturing fluid 140 as it traverses the wellbore 110.

As the SMA beads traverse the wellbore 110 with the hydraulic fracturing fluid 140, the SMA beads will collect inside one or more tertiary paths 150—which will subsequently be described in more detail—and form bridges 310 of SMA beads. The hydraulic fracturing fluid 140 will have an initial flow rate across the SMA bridges 310, which may be referred to as the "initial hydraulic fracturing fluid flow rate." Although the initial hydraulic fracturing fluid flow rate cannot be measured directly, certain indicators can be used to determine the flow rate. One such indicator is an increase in the injection pressure at same rate (also called diverter pressure response), which indicates there is a flow restriction. Another method is using a tracer. At production time, tracers tell how the fluid moves from one zone to another. Also, production logs tools (PLT) show how effective the diverter is in the process. Finally, total injection rate is known at the surface by pump meters. These indicators may be used by a person of ordinary skill in the art to determine the initial hydraulic fracturing fluid flow rate.

Figure 3B:
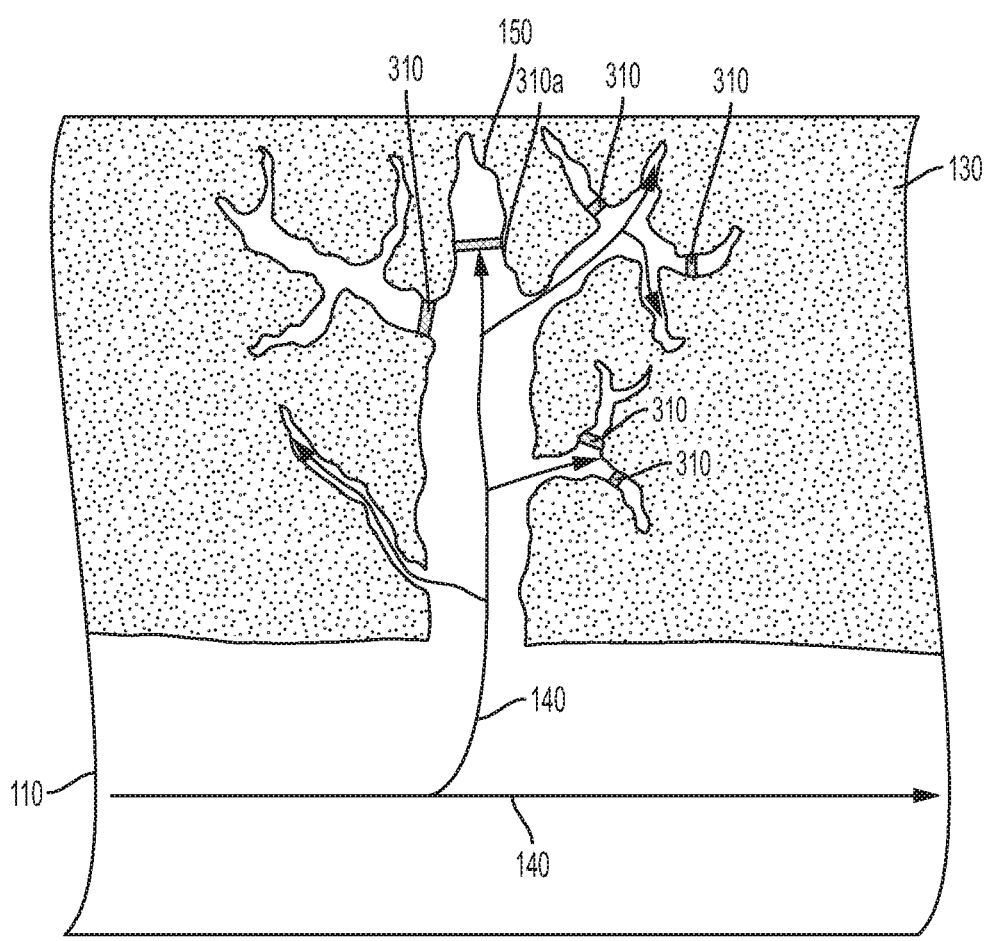
FIGS. 3B and 3D are schematics of a wellbore having a shape memory alloy bridge having a lesser hydraulic fluid flow rate according to embodiments of this disclosure.

As the hydraulic fracturing fluid 140 continues to be pumped into the wellbore 110, a pressure drop across the SMA bridges 310 will be created and more and more stress will be placed on the SMA bridges 310. Eventually, and with reference to FIG. 3B, this stress placed on the SMA bridges 310 will reach a level that the SMA beads forming the SMA bridges 310 deform, for example, the SMA may deform from a martensite phase or an austenite phase. Additionally, as the hydraulic fracturing fluid 140 traversers down the wellbore 110 it cools, which further promotes deformation of the SMA bridges 310. This deformation of the SMA beads will cause the flow rate of hydraulic fracturing fluid 140 across the SMA bridges 310 to decrease and the flow of hydraulic fracturing fluid 140 through the SMA bridges 310 will be reduced or even temporarily stopped as shown in FIG. 3B. This decreased flow rate of the hydraulic fracturing fluid 140 across the SMA bridges 310 may be referred to as the "second hydraulic fracturing fluid flow rate" or the "decreased hydraulic fracturing fluid flow rate." Although the second hydraulic fracturing fluid flow rate cannot be measured directly, certain indicators can be used to determine the flow rate. One such indicator is an increase in the injection pressure at same rate (also called diverter pressure response), which indicates there is a flow restriction. Another method is using a tracer. At production time, tracers tell how the fluid moves from one zone to another. Also, PLTs show how effective the diverter is in the process. Finally, total injection rate is known at surface by pump meters. These indicators may be used by a person of ordinary skill in the art to determine the second hydraulic fracturing fluid flow rate.

As shown in FIG. 3A and FIG. 3B, the SMA bridges 310 are formed in the tertiary path 150 at far-field formations and SMA bridges 310a are formed at a near wellbore location, which causes less, or in some cases no, hydraulic fracturing fluid 140 to enter the portions of the tertiary path 150 where the bridges 310, 310a are formed. The reduced flow rate of the hydraulic fracturing fluid 140 across the SMA bridges 310 will cause the tertiary path 150 to be more fully developed and form more complex tertiary paths, which can lead to more extraction of hydrocarbons from the geological formation 130.

Figure 3C:
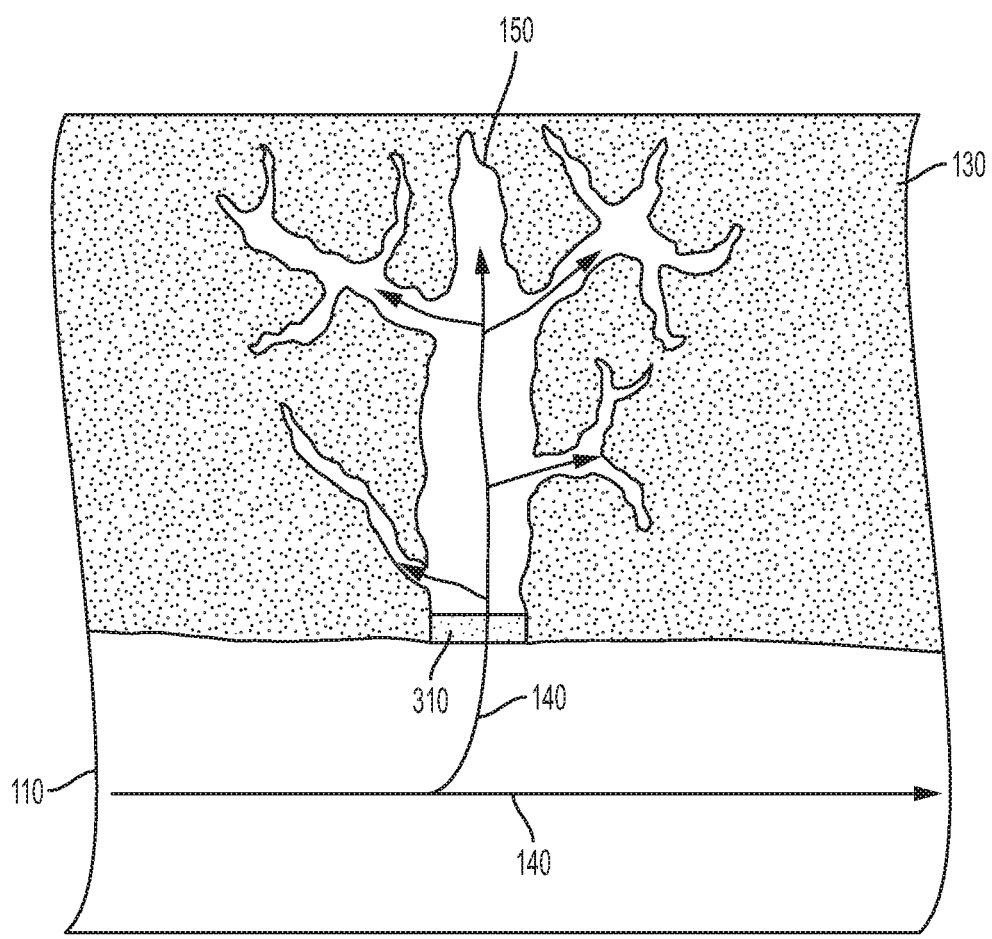
Figure 3D:
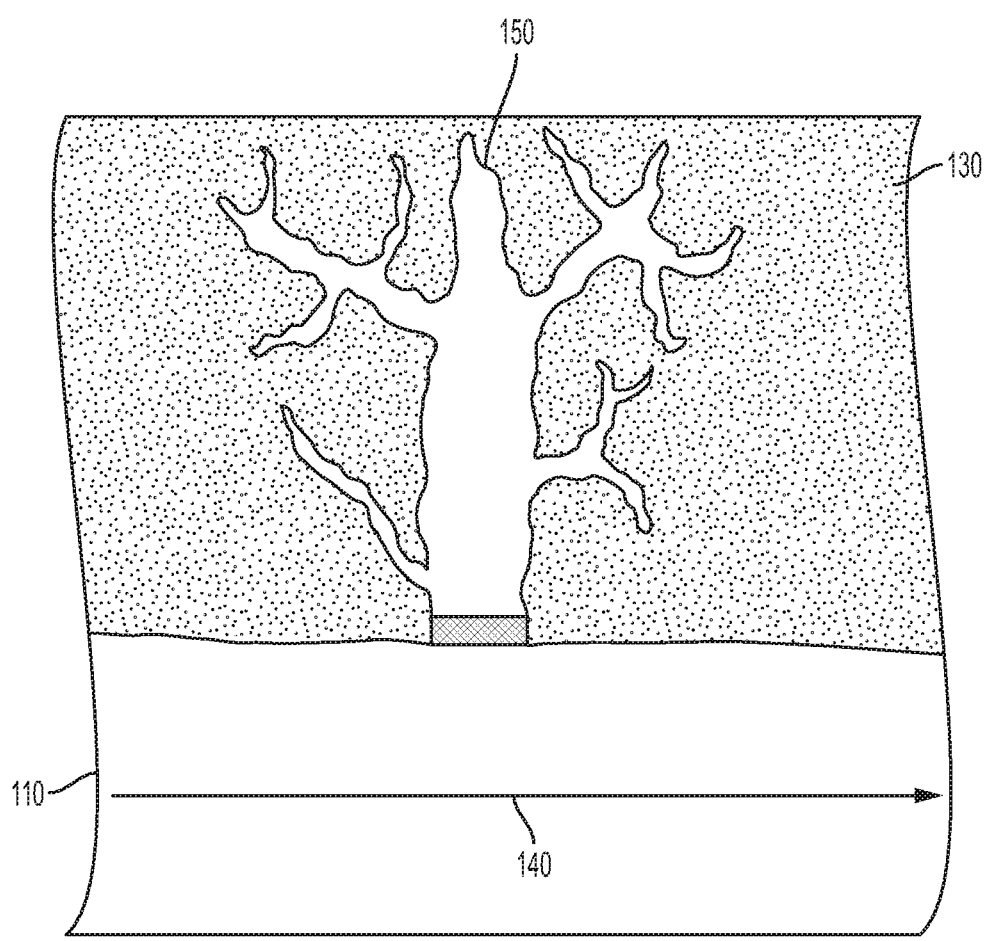

With reference now to FIG. 3C, SMA beads may form a bridge 310 in a perforation zone of the tertiary path 150. As disclosed previously with reference to FIG. 3A, the hydraulic fracturing fluid 140 will have an initial hydraulic fracturing fluid flow rate across the SMA bridge 310. As the hydraulic fracturing fluid 140 continues to be pumped into the wellbore 110, a pressure drop across the SMA bridge 310 will be created and more and more stress will be placed on the SMA bridge 310. Eventually, and with reference to FIG. 3D, this stress placed on the SMA bridge 310 will reach a level that the SMA beads forming the SMA bridge 310 deform, for example, the SMA may deform from a martensite phase or an austenite phase. Additionally, as the hydraulic fracturing fluid 140 traversers down the wellbore 110 it cools, which further promotes deformation of the SMA bridge 310. This deformation of the SMA beads will cause the flow rate of hydraulic fracturing fluid 140 across the SMA bridge 310 to decrease to the second hydraulic fracturing fluid flow rate. Forming the SMA bridge 310 at a perforation zone within the tertiary path 150 allows the hydraulic fracturing fluid 140 to flow into tertiary paths 150 upstream from the tertiary path where the SMA bridge 310 is present. Forming the SMA bridge 310 in perforation zone will allow tertiary paths to be more fully developed by diverting hydraulic fracturing fluid 140 from the tertiary path where the SMA bridge 310 is present to other tertiary paths.

Using various sizes of SMA beads determines whether the SMA bridges 310 will be formed at a near wellbore location or at a far-field formation. As an example, near well bore locations generally have a greater sized opening than far-field formation. Accordingly, lesser sized SMAs will flow through a near wellbore location and collect in far-field formation. As another example, greater sized SMAs may be too large to enter far-field formation, and therefore will collect at near wellbore locations. The sizes of SMA beads that may be used for various bridge locations is subsequently discussed in more detail. In embodiments, SMA bridges may be formed in any combination of far-field, near wellbore, and perforation zones.

With reference now to any of FIG. 3A to FIG. 3D, after some time with the SMA bridges 310 being in a state that allows the decreased hydraulic fracturing fluid flow rate, the temperature within the wellbore 110 will be increased, causing the SMA bridges 310 to be heated. This heating will cause reformation of the SMA beads in the SMA bridges 310 back to a phase, such as from austenite to martensite, that permits a greater flow rate of the hydraulic fracturing fluid 140 across the SMA bridges 310. This greater flow rate of the hydraulic fracturing fluid 140 across the SMA bridges 310 may be referred to as the "third hydraulic fracturing fluid flow rate" or the "greater hydraulic fracturing fluid flow rate." This reversion back to a phase that allows the greater hydraulic fracturing fluid flow rate will allow for more hydraulic fracturing fluid 140 to travel through the SMA bridges 310 (as shown in FIG. 3A) and downhole in the wellbore 110.

In embodiments, the second hydraulic fracturing fluid flow rate is from greater than or equal to 0% to less than or equal to 40% of the initial hydraulic fracturing fluid flow rate. Accordingly, the second hydraulic fracturing fluid flow rate can be zero, where there is no flow of hydraulic fracturing fluid 140 through the SMA bridge 310. In some embodiments, the second hydraulic fracturing fluid flow rate is from greater than or equal to 5% to less than or equal to 40% of the initial hydraulic fracturing fluid flow rate, such as from greater than or equal to 10% to less than or equal to 40% of the initial hydraulic fracturing fluid flow rate, from greater than or equal to 15% to less than or equal to 40% of the initial hydraulic fracturing fluid flow rate, from greater than or equal to 20% to less than or equal to 40% of the initial hydraulic fracturing fluid flow rate, from greater than or equal to 25% to less than or equal to 40% of the initial hydraulic fracturing fluid flow rate, from greater than or equal to 30% to less than or equal to 40% of the initial hydraulic fracturing fluid flow rate, or from greater than or equal to 35% to less than or equal to 40% of the initial hydraulic fracturing fluid flow rate. In some embodiments, the second hydraulic fracturing fluid flow rate is from greater than or equal to 0% to less than or equal to 35% of the initial hydraulic fracturing fluid flow rate, such as from greater than or equal to 0% to less than or equal to 30% of the initial hydraulic fracturing fluid flow rate, from greater than or equal to 0% to less than or equal to 25% of the initial hydraulic fracturing fluid flow rate, from greater than or equal to 0% to less than or equal to 20% of the initial hydraulic fracturing fluid flow rate, from greater than or equal to 0% to less than or equal to 15% of the initial hydraulic fracturing fluid flow rate, from greater than or equal to 0% to less than or equal to 10% of the initial hydraulic fracturing fluid flow rate, or from greater than or equal to 0% to less than or equal to 5% of the initial hydraulic fracturing fluid flow rate, In embodiments, the third hydraulic fracturing fluid flow rate is from greater than or equal to 70% to less than or equal to 100% of the initial hydraulic fracturing fluid flow rate, such as from greater than or equal to 75% to less than or equal to 100% of the initial hydraulic fracturing fluid flow rate, from greater than or equal to 80% to less than or equal to 100% of the initial hydraulic fracturing fluid flow rate, from greater than or equal to 80% to less than or equal to 100% of the initial hydraulic fracturing fluid flow rate, from greater than or equal to 90% to less than or equal to 100% of the initial hydraulic fracturing fluid flow rate, or from greater than or equal to 95% to less than or equal to 100% of the initial hydraulic fracturing fluid flow rate. In some embodiments, the third hydraulic fracturing fluid flow rate is from greater than or equal to 70% to less than or equal to 95% of the initial hydraulic fracturing fluid flow rate, such as from greater than or equal to 70% to less than or equal to 90% of the initial hydraulic fracturing fluid flow rate, from greater than or equal to 70% to less than or equal to 85% of the initial hydraulic fracturing fluid flow rate, from greater than or equal to 70% to less than or equal to 80% of the initial hydraulic fracturing fluid flow rate, or from greater than or equal to 70% to less than or equal to 75% of the initial hydraulic fracturing fluid flow rate.

The change in temperature within the wellbore 110 that causes the SMA beads to change phase can be effectuated by a number of mechanisms. For instance, a greater viscosity hydraulic fracturing fluid 140, such as slickwater, that is being pumped into the wellbore 110 at a greater injection rate, such as up to 130 barrels per min (bbl/min), will make the downhole temperature close to the surface temperature. In contrast, a lesser viscosity hydraulic fracturing fluid 140, such as crosslinked gel, that is being pumped into the wellbore 110 at lesser injection rate, such as 20 bbl/min, will make the downhole temperature close to the reservoir temperature, which is greater than the surface temperature. It should be understood that the temperature within the wellbore 110 and the effect that different hydraulic fluids and injection rates will have on the temperature within the wellbore 110 can be determined by a skilled artisan using wellbore temperature models and modeling software.

The temperatures previously discussed to which the wellbore 110 is heated to deform the SMA beads may be determined by the type of SMA beads that are included in the hydraulic fracturing fluid 140. Although any SMA beads may be used to effectuate increased and decreased flow rate of hydraulic fluid 140 across the SMA bridge 310, in some embodiments, the SMA beads are selected from two main types of SMAs; copper-aluminum-nickel (Cu—Al—Ni) and nickel-titanium (Ni—Ti) alloys. However, in other embodiments, SMAs are created by alloying zinc, copper, gold, iron, and various combinations of these metals. Although iron-based and copper-based SMAs, such as iron-manganese-silicon (Fe—Mn—Si), copper-zinc-aluminum (Cu—Zn—Al), and copper-aluminum-nickel (Cu—Al—Ni), are commercially available and less expensive than NiTi, NiTi SMAs are preferable for most applications due to their stability, practicability, and superior thermo-mechanic performance.

In addition to the type of SMAs used in embodiments, the size of the SMA beads used will affect the functionality of the SMA beads. If the SMA beads are too large, they will screen out material that is needed for near-wellbore diversion and plugging. Further, SMA beads that are too large are not suitable for far-field diversion. However, if the SMA beads are too small, they cannot be used for either near-wellbore or far-field diversion and plugging. As previously stated the shape of the SMA beads used in embodiments is not particularly limited, and the SMA beads may have any suitable geometry that will form an SMA bridge as previously disclosed. However, in some embodiments, the SMA beads are spherical, which is defined in this disclosure as being spherical with minor variations in diameter that are not intended in the manufacturing process. In such embodiments, the SMA beads have an average diameter, $d_{50}$, as measured by American Petroleum Institute (API) RP 13C (2014) from greater than or equal to 0.075 millimeters (mm) to less than or equal to 8.000 mm, such as from greater than or equal to 0.500 mm to less than or equal to 8.000 mm, from greater than or equal to 1.000 mm to less than or equal to 8.000 mm, from greater than or equal to 1.500 mm to less than or equal to 8.000 mm, from greater than or equal to 2.000 mm to less than or equal to 8.000 mm, from greater than or equal to 2.500 mm to less than or equal to 8.000 mm, from greater than or equal to 3.000 mm to less than or equal to 8.000 mm, from greater than or equal to 3.500 mm to less than or equal to 8.000 mm, from greater than or equal to 4.000 mm to less than or equal to 8.000 mm, from greater than or equal to 4.500 mm to less than or equal to 8.000 mm, from greater than or equal to 5.000 mm to less than or equal to 8.000 mm, from greater than or equal to 5.500 mm to less than or equal to 8.000 mm, from greater than or equal to 6.000 mm to less than or equal to 8.000 mm, from greater than or equal to 6.500 mm to less than or equal to 8.000 mm, from greater than or equal to 7.000 mm to less than or equal to 8.000 mm, or from greater than or equal to 7.500 mm to less than or equal to 8.000 mm. In other embodiments, the SMA beads have an average diameter from greater than or equal to from greater than or equal to 0.075 mm to less than or equal to 7.500 mm, from greater than or equal to 0.075 mm to less than or equal to 7.000 mm, from greater than or equal to 0.075 mm to less than or equal to 6.500 mm, from greater than or equal to 0.075 mm to less than or equal to 6.000 mm, from greater than or equal to 0.075 mm to less than or equal to 5.500 mm, from greater than or equal to 0.075 mm to less than or equal to 5.000 mm, from greater than or equal to 0.075 mm to less than or equal to 4.500 mm, from greater than or equal to 0.075 mm to less than or equal to 4.000 mm, from greater than or equal to 0.075 mm to less than or equal to 3.500 mm, from greater than or equal to 0.075 mm to less than or equal to 3.000 mm, from greater than or equal to 0.075 mm to less than or equal to 2.500 mm, from greater than or equal to 0.075 mm to less than or equal to 2.000 mm, from greater than or equal to 0.075 mm to less than or equal to 1.500 mm, from greater than or equal to 0.075 mm to less than or equal to 1.000 mm, or from greater than or equal to 0.075 mm to less than or equal to 0.500 mm.

The diameter of the SMA beads may also be used to direct the SMA bridge 310 to specific sized tertiary paths 150 in the target geological formation 130. For example, smaller-diameter SMA beads will infiltrate smaller-sized tertiary paths 150 in the target geological formation 130, and larger-diameter SMA beads will infiltrate larger-sized fissures 150 in the target geological formation 130. In some embodiments, SMA beads having an average particle size of 140-30, such as from 10-30 mesh as measured by API RP 13C can be used to infiltrate tertiary paths 150 having a width of 0.01 inches (in) or greater. In other embodiments, SMA beads having an average particle size of 140-8 mesh, such as 12-8 mesh can be used to infiltrate tertiary paths 150 having a width of 0.10 in or greater. In yet other embodiments, SMA beads having an average particle size of 140-6 mesh, such as 12-6 mesh, can be used to infiltrate tertiary paths 150 having a width of 0.20 in or greater. It should also be understood that, in various embodiments, more than one size of SMA beads may be combined and used simultaneously to infiltrate different sized tertiary paths 150 in a single pumping of hydraulic fracturing fluid 140. Using these different sized SMA beads will allow one to target the SMA bridge 310 formation over the perforation zone, the near wellbore region, or the far-field region, as one desires, to maximize the formation and size of tertiary paths 150. As an example, SMA beads having average sizes from greater than or equal to 0.075 mm to less than or equal to 8.000 mm may be used to form a bridge at a perforation zone, SMA beads having average sizes from greater than or equal to 0.075 mm to less than or equal to 4.000 mm may be used to form a bridge at a near wellbore location, and SMA beads having average sizes from greater than or equal to 0.075 mm to less than or equal to 0.420 mm may be used to form bridges in far-field locations.

In addition to the size of the SMA beads, the concentration of the SMA beads injected into the wellbore 110 will affect the performance of the SMA beads. A large concentration of SMA beads injected into the wellbore 110 will screen out materials that are needed for diversion and plugging in the near wellbore and therefore not useful for far-field diversion. Further, as one would expect, if the concentration of SMA beads injected into the wellbore 110 is too small, there may be an insufficient amount of SMA beads to effectively form the SMA bridge 310. Accordingly, in one or more embodiments, the SMA beads may be injected into the wellbore 110 at a concentration from greater than or equal to 0.01 pounds per gallon (ppga) to less than or equal to 20.00 ppga, such as from greater than or equal to 0.50 ppga to less than or equal to 20.00 ppga, from greater than or equal to 1.00 ppga to less than or equal to 20.00 ppga, from greater than or equal to 2.00 ppga to less than or equal to 20.00 ppga, from greater than or equal to 3.00 ppga to less than or equal to 20.00 ppga, from greater than or equal to 4.00 ppga to less than or equal to 20.00 ppga, from greater than or equal to 5.00 ppga to less than or equal to 20.00 ppga, from greater than or equal to 6.00 ppga to less than or equal to 20.00 ppga, from greater than or equal to 7.00 ppga to less than or equal to 20.00 ppga, from greater than or equal to 8.00 ppga to less than or equal to 20.00 ppga, from greater than or equal to 9.00 ppga to less than or equal to 20.00 ppga, from greater than or equal to 10.00 ppga to less than or equal to 20.00 ppga, from greater than or equal to 11.00 ppga to less than or equal to 20.00 ppga, from greater than or equal to 12.00 ppga to less than or equal to 20.00 ppga, from greater than or equal to 13.00 ppga to less than or equal to 20.00 ppga, from greater than or equal to 14.00 ppga to less than or equal to 20.00 ppga, from greater than or equal to 15.00 ppga to less than or equal to 20.00 ppga, from greater than or equal to 16.00 ppga to less than or equal to 20.00 ppga, from greater than or equal to 17.00 ppga to less than or equal to 20.00 ppga, from greater than or equal to 18.00 ppga to less than or equal to 20.00 ppga, or from greater than or equal to 19.00 ppga to less than or equal to 20.00 ppga. In other embodiments, the SMA beads may be injected into the wellbore 110 at a concentration from greater than or equal to 0.01 ppga to less than or equal to 19.50 ppga, such as from greater than or equal to 0.01 ppga to less than or equal to 19.00 ppga, from greater than or equal to 0.01 ppga to less than or equal to 18.00 ppga, from greater than or equal to 0.01 ppga to less than or equal to 17.00 ppga, from greater than or equal to 0.01 ppga to less than or equal to 16.00 ppga, from greater than or equal to 0.01 ppga to less than or equal to 15.00 ppga, from greater than or equal to 0.01 ppga to less than or equal to 14.00 ppga, from greater than or equal to 0.01 ppga to less than or equal to 13.00 ppga, from greater than or equal to 0.01 ppga to less than or equal to 12.00 ppga, from greater than or equal to 0.01 ppga to less than or equal to 11.00 ppga, from greater than or equal to 0.01 ppga to less than or equal to 10.00 ppga, from greater than or equal to 0.01 ppga to less than or equal to 9.00 ppga, from greater than or equal to 0.01 ppga to less than or equal to 8.00 ppga, from greater than or equal to 0.01 ppga to less than or equal to 7.00 ppga, from greater than or equal to 0.01 ppga to less than or equal to 6.00 ppga, from greater than or equal to 0.01 ppga to less than or equal to 5.00 ppga, from greater than or equal to 0.01 ppga to less than or equal to 4.00 ppga, from greater than or equal to 0.01 ppga to less than or equal to 3.00 ppga, from greater than or equal to 0.01 ppga to less than or equal to 2.00 ppga, from greater than or equal to 0.01 ppga to less than or equal to 1.00 ppga, or from greater than or equal to 0.01 ppga to less than or equal to 0.50 ppga.

Certain additives may be injected into the wellbore 110 with the SMA beads, according to one or more embodiments. These additives may be used to enhance the bead pack permeability and to improve bridging of the SMA beads. In some embodiments, the additives are biodegradable and diverter materials, such as polylactic acid (PLA) fibers, PLA beads, wax beads, benzoic acid flakes, and mixtures thereof. The additives may, in some embodiments, be added to the mixture in a concentration from greater than or equal to 1.0 ppga to less than or equal to 3.0 ppga, such as from greater than or equal to 1.5 ppga to less than or equal to 3.0 ppga, from greater than or equal to 2.0 ppga to less than or equal to 3.0 ppga, or from greater than or equal to 2.5 ppga to less than or equal to 3.0 ppga. In some embodiments, the additives may be added in a concentration from greater than or equal to 1.0 ppga to less than or equal to 2.5 ppga, from greater than or equal to 1.0 ppga to less than or equal to 2.0 ppga, or from greater than or equal to 1.0 ppga to less than or equal to 2.5 ppga.

According to a first aspect, a method for extracting natural gas or petroleum-based products, comprising: introducing shape memory alloy beads into a wellbore with hydraulic fracturing fluid to form a bridge comprising shape memory alloy beads in a tertiary path, where the shape memory alloy beads forming the bridge have a first phase, and the hydraulic fracturing fluid has an initial hydraulic fracturing fluid flow rate across the bridge; applying a pressure to transform the shape memory alloy beads forming the bridge to a second phase, where deforming the shape memory alloy beads forming the bridge causes the hydraulic fracturing fluid to have a second hydraulic fracturing fluid flow rate across the bridge, where the second hydraulic fracturing fluid flow rate is less than the initial hydraulic fracturing fluid flow rate; and introducing hydraulic fracturing fluid such that the temperature of the shape memory alloy beads forming the bridge approach the temperature of the hydrocarbon-bearing formation and convert from the second phase to the first phase.

A second aspect includes the method of the first aspect, where the first phase is an austenite phase and the second phase is a martensite phase.

A third aspect includes the method of any one of the first and second aspects, where the second hydraulic fracturing fluid flow rate is from greater than or equal to 0% to less than or equal to 40% of the initial hydraulic fracturing fluid flow rate.

A fourth aspect includes the method of any one of the first to third aspects, where the second hydraulic fracturing fluid flow rate is zero.

A fifth aspect includes the method of any one of the first to fourth aspects, where the third hydraulic fracturing flow rate is from greater than or equal to 70% to less than or equal to 100% of the initial hydraulic fracturing fluid flow rate.

A sixth aspect includes the method of any one of the first to fifth aspects, where the shape memory alloy beads include a shape memory alloy selected from the group consisting of alloys of zinc, copper, gold, iron, and combinations of these alloys.

A seventh aspect includes the method of any one of the first to sixth aspects, where the shape memory alloy beads include copper-aluminum-nickel alloy and nickel-titanium alloy.

An eighth aspect includes the method of any one of the first to seventh aspects, where the shape memory alloy beads include nickel-titanium alloy.

A ninth aspect includes the method of any one of the first to eighth aspects, where the shape memory alloy beads are essentially spherical and have an average diameter from greater than or equal to 0.075 mm to less than or equal to 8.000 mm.

A tenth aspect includes the method of any one of the first to ninth aspects, where the shape memory alloy beads are essentially spherical and have an average diameter from greater than or equal to 0.075 mm to less than or equal to 5.000 mm.

An eleventh aspect includes the method of any one of the first to tenth aspects, where the shape memory alloy beads are injected into the wellbore at a concentration from greater than or equal to 0.01 ppga to less than or equal to 20.00 ppga.

A twelfth aspect includes the method of any one of the first to eleventh aspects, where the shape memory alloy beads are injected into the wellbore at a concentration from greater than or equal to 0.01 ppga to less than or equal to 2.00 ppga.

A thirteenth aspect includes the method of any one of the first to twelfth aspects, where the shape memory alloy beads infiltrate tertiary paths having a width of 0.01 inches or greater.

A fourteenth aspect includes the method of the thirteenth aspect, where the shape memory alloy beads have an average particle size of 140-30 mesh.

A fifteenth aspect includes the method of any one of the first to twelfth aspects, where the shape memory alloy beads infiltrate tertiary paths having a width of 0.10 inches or greater.

A sixteenth aspect includes the method of the fifteenth aspect, where the shape memory alloy beads have an average particle size of 140-8 mesh.

A seventeenth aspect includes the method of any one of the first to twelfth aspects, where the shape memory alloy beads infiltrate tertiary paths having a width of 0.20 inches or greater.

An eighteenth aspect includes the method of the seventeenth aspect, where the shape memory alloy beads have an average particle size of 140-6 mesh.

A nineteenth aspect includes the method of any one of the first to eighteenth aspects, where the hydraulic fracturing fluid is selected from the group consisting of slick water, linear gel, crosslinked gel, foamed fluid, visco-elastic surfactant based fluid, emulsified fluid, and mixtures of these fluids.

A twentieth aspect includes the method of any one of the first to nineteenth aspects, where the shape memory alloy beads are mixed with the hydraulic fracturing fluid before the hydraulic fracturing fluid is injected into the wellbore.

A twenty first aspect includes the method of any one of the first to twentieth aspects, where the shape memory alloy beads are mixed with a proppant selected from the group consisting of sand, ceramic proppant, and plastic proppant.

A twenty second aspect includes the method of any one of the first to twenty first aspects, where the shape memory alloy beads are mixed with soluble solid particles.

It will be apparent to those skilled in the art that various modifications and variations can be made to the embodiments described in this application without departing from the spirit and scope of the claimed subject matter. Thus it is intended that the specification cover the modifications and variations of the various embodiments described in this application provided such modifications and variations come within the scope of the appended claims and their equivalents.

What is claimed is:

1. A method for extracting natural gas or petroleum-based products, comprising:
    introducing shape memory alloy beads into a wellbore with hydraulic fracturing fluid to form a bridge comprising shape memory alloy beads in a tertiary path, where the shape memory alloy beads forming the bridge have a first phase, and the hydraulic fracturing fluid has an initial hydraulic fracturing fluid flow rate across the bridge;
    applying a pressure to transform the shape memory alloy beads forming the bridge to a second phase, where deforming the shape memory alloy beads forming the bridge causes the hydraulic fracturing fluid to have a second hydraulic fracturing fluid flow rate across the bridge, where the second hydraulic fracturing fluid flow rate is less than the initial hydraulic fracturing fluid flow rate; and
    introducing hydraulic fracturing fluid such that the temperature of the shape memory alloy beads forming the bridge approach the temperature of the hydrocarbon-bearing formation and convert from the second phase to the first phase,
    where the second hydraulic fracturing fluid flow rate is from greater than or equal to 0.0% to less than or equal to 40.0% of the initial hydraulic fracturing fluid flow rate.

2. The method of claim 1, where the first phase is an austenite phase and the second phase is a martensite phase.

3. The method of claim 1, where the second hydraulic fracturing fluid flow rate is zero.

4. The method of claim 3, where a third hydraulic fracturing flow rate is from greater than or equal to 70.0% to less than or equal to 100.0% of the initial hydraulic fracturing fluid flow rate.

5. The method of claim 1, where the shape memory alloy beads comprise a shape memory alloy selected from the group consisting of alloys of zinc, copper, gold, iron, and combinations of these alloys.

6. The method of claim 1, where the shape memory alloy beads comprise copper-aluminum-nickel alloy and nickel-titanium alloy.

7. The method of claim 1, where the shape memory alloy beads comprise nickel-titanium alloy.

8. The method of claim 1, where the shape memory alloy beads are essentially spherical and have an average diameter from greater than or equal to 0.075 mm to less than or equal to 8.000 mm.

9. The method of claim 1, where the shape memory alloy beads are essentially spherical and have an average diameter from greater than or equal to 0.075 mm to less than or equal to 5.000 mm.

10. The method of claim 1, where the shape memory alloy beads are injected into the wellbore at a concentration from greater than or equal to 0.01 ppga to less than or equal to 20.00 ppga.

11. The method of claim 1, where the shape memory alloy beads are injected into the wellbore at a concentration from greater than or equal to 0.01 ppga to less than or equal to 2.00 ppga.

12. The method of claim 1, where the shape memory alloy beads infiltrate tertiary paths having a width of 0.01 inches or greater.

13. The method of claim 12, where the shape memory alloy beads have range of particle size of 140-30 mesh.

14. The method of claim 1, where the shape memory alloy beads infiltrate tertiary paths having a width of 0.10 inches or greater.

15. The method of claim 14, where the shape memory alloy beads have range of particle size of 140-8 mesh.

16. The method of claim 1, where the shape memory alloy beads infiltrate tertiary paths having a width of 0.20 inches or greater.

17. The method of claim 16, where the shape memory alloy beads have range of particle size of 140-6 mesh.

18. The method of claim 1, where the hydraulic fracturing fluid is selected from the group consisting of slick water, linear gel, crosslinked gel, foamed fluid, visco-elastic surfactant based fluid, emulsified fluid, and mixtures of these fluids.

19. The method of claim 1, where the shape memory alloy beads are mixed with the hydraulic fracturing fluid before the hydraulic fracturing fluid is injected into the wellbore.

20. The method of claim 1, where the shape memory alloy beads are mixed with a proppant selected from the group consisting of sand, ceramic proppant, and plastic proppant.

21. The method of claim 1, where the shape memory alloy beads are mixed with soluble solid particles.

* * * * *